US012625610B2

(12) United States Patent
Luo et al.

(10) Patent No.: US 12,625,610 B2
(45) Date of Patent: May 12, 2026

(54) DATA COMPRESSION METHOD AND APPARATUS, COMPUTING DEVICE, AND STORAGE SYSTEM

(71) Applicant: HUAWEI TECHNOLOGIES CO., LTD., Guangdong (CN)

(72) Inventors: Sizhe Luo, Hangzhou (CN); Ruliang Dong, Hangzhou (CN); Hongde Zhu, Hangzhou (CN); Yong Sun, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/401,736

(22) Filed: Jan. 2, 2024

(65) Prior Publication Data

US 2024/0134523 A1      Apr. 25, 2024
US 2024/0231616 A9      Jul. 11, 2024

Related U.S. Application Data

(63) Continuation of application No. PCT/CN2022/100440, filed on Jun. 22, 2022.

(30) Foreign Application Priority Data

Jul. 8, 2021      (CN) .......................... 202110773759.3
Sep. 22, 2021    (CN) .......................... 202111109332.X

(51) Int. Cl.
    *G06F 3/06*          (2006.01)
(52) U.S. Cl.
    CPC .......... *G06F 3/0608* (2013.01); *G06F 3/0638* (2013.01); *G06F 3/0679* (2013.01)

(58) Field of Classification Search
    CPC ...... G05B 13/00–048; G05B 15/00–02; G05B 17/00–02; G06F 1/00–3296;
    (Continued)

(56) References Cited

U.S. PATENT DOCUMENTS 5,313,559 A * 5/1994 Ogata ...................... G06N 3/08
                                                            706/44
9,143,161 B1* 9/2015 Greene ................... H04L 67/10
    (Continued)

FOREIGN PATENT DOCUMENTS

CN          102332162 A      1/2012
CN          102521363 A      6/2012
    (Continued)

OTHER PUBLICATIONS

Class Notes CS 3137; Jun. 26, 2018; retrieved from https://web.archive.org/web/20180626171204/https://www.cs.columbia.edu/~allen/S14/NOTES/lzw.pdf on Sep. 8, 2025 (Year: 2018).*
    (Continued)

*Primary Examiner* — Daniel C. Chappell

(57)                ABSTRACT

In a data compression method, a computing device determines a compression feature value of to-be-compressed data based on a first parameter that affects a compression result of the to-be-compressed data. The computing device determines, based on the compression feature value, a compression policy for compressing the to-be-compressed data. The computing device then compresses the to-be-compressed data according to the compression policy to obtain compressed data, and stores the compressed data.

18 Claims, 10 Drawing Sheets

(58) Field of Classification Search

CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56)                References Cited

U.S. PATENT DOCUMENTS

| | | | | | |
|---|---|---|---|---|---|
| 9,294,122 | B2 * | 3/2016 | Greene | ................... | H03M 7/30 |
| 10,585,856 | B1 * | 3/2020 | Bigman | ................ | G06F 3/0604 |
| 10,732,884 | B1 * | 8/2020 | Gupta | ................... | G06F 3/0647 |
| 2008/0228998 | A1 * | 9/2008 | Colecchia | ............. | G06F 3/0679 |
| | | | | | 711/103 |
| 2013/0132353 | A1 * | 5/2013 | Mande | ................... | G16B 30/00 |
| | | | | | 707/693 |
| 2013/0275396 | A1 * | 10/2013 | Condict | ................. | H03M 7/30 |
| | | | | | 707/693 |
| 2015/0311915 | A1 * | 10/2015 | Greene | ................... | H03M 7/30 |
| | | | | | 341/107 |
| 2018/0199066 | A1 | 7/2018 | Ross | | |
| 2020/0311180 | A1 * | 10/2020 | Cho | ................... | H03M 7/3059 |
| 2023/0233403 | A1 * | 7/2023 | Nunokawa | ........... | A61B 5/1122 |
| | | | | | 601/41 |

FOREIGN PATENT DOCUMENTS

| | | |
|---|---|---|
| CN | 107682452 A | 2/2018 |
| CN | 109739444 A | 5/2019 |
| CN | 109783033 A | 5/2019 |
| CN | 109962710 A | 7/2019 |
| EP | 0729237 A2 | 8/1996 |

OTHER PUBLICATIONS

F. H. Zeinalabedin, N. Eftekhari and A. T. Haghighat, "A New Algorithm for Calculating Adaptive Character Wordlength via Estimating Compressed File Size," 2010 Second International Conference on Computer Research and Development, Kuala Lumpur , Malaysia, 2010, pp. 12-16, doi: 10.1109/ICCRD.2010.7. (Year: 2010).*

M. H. Haghbayan, S. Karamati, F. Javaheri and Z. Navabi, "Test Pattern Selection and Compaction for Sequential Circuits in an HDL Environment, " 2010 19th IEEE Asian Test Symposium, Shanghai, China, 2010, pp. 53-56, doi: 10.1109/ATS.2010.85. (Year: 2010).*

H. Shimura, T. Mitsuishi, M. Kan, T. Yoshikawa and H. Amano, "On-the-Fly Data Compression/Decompression Mechanism with ExpEther," 2016 Fourth International Symposium on Computing and Networking (CANDAR), Hiroshima, Japan, 2016, pp. 112-118, doi: 10.1109/CANDAR.2016.0031. (Year: 2016).*

C. Krintz et al: "Adaptive on-the-fly compression", IEEE Transactions On Parallel and Distributed Systems, vol. 17, No. 1, Jan. 1, 2006 (Jan. 1, 2006), pp. 15-24, XP055331950.

Van Kooten Pascal: "shrynk-Using Machine Learning to learn how to Compress", Dec. 5, 2019 (Dec. 5, 2019), pp. 1-11, XP093184807.

* cited by examiner

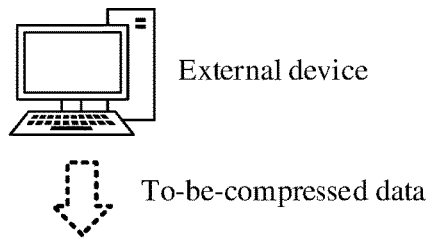

External device

To-be-compressed data

Computing device

Step 420: Collect a parameter

Step 410: Obtain the to-be-compressed data

Parameter of a hardware resource

Parameter of a data feature

Parameter that affects a compression result of the to-be-compressed data

Parameter of the hardware resource

Usage ratio of a processor

Network bandwidth between the computing device and the storage device

Bandwidth of a storage device

Available storage capacity of the storage device

...

Parameter of the data feature

Data type

Data block size

Distribution of characters included in the to-be-compressed data

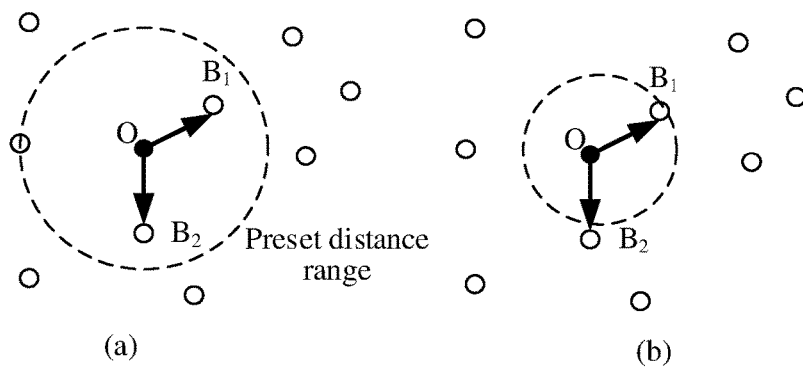

Boundary

To-be-encoded data aacaacabcabaaac

Dictionary   To-be-encoded area
area (a)

Boundary

To-be-encoded data aacaacabcabaaac

Dictionary   To-be-encoded area
area (b)

Boundary

To-be-encoded data aacaacabcabaaac

Dictionary   To-be-encoded area
area (c)

Boundary

To-be-encoded data aacaacabcabaaac

Dictionary   To-be-encoded area
area (d)

Boundary

To-be-encoded data aacaacabcabaaac

Dictionary   To-be-encoded area
area (e)

Boundary aacaacabcabaaac

Dictionary   To-be-encoded area
area (f)

FIG. 6

DATA COMPRESSION METHOD AND APPARATUS, COMPUTING DEVICE, AND STORAGE SYSTEM

CROSS-REFERENCE TO RELATED APPLICATIONS

This application is a continuation of International Application PCT/CN2022/100440, filed on Jun. 22, 2022, which claims priority to Chinese Patent Application No. 202111109332. X, filed on Sep. 22, 2021, and Chinese Patent Application No. 202110773759.3, filed on Jul. 8, 2021. The aforementioned priority application are hereby incorporated by reference in their entirety.

TECHNICAL FIELD

This application relates to the field of data compression, and in particular, to a data compression method and apparatus, a computing device, and a storage system.

BACKGROUND

With the prosperity of cloud computing and big data industries, a larger data center scale indicates more data stored in the data center. A larger data size and a longer storage period mean higher storage costs. Currently, a computing device may compress to-be-stored data by using a compression algorithm (such as LZ4, LZO, or Snappy) before storing the to-be-stored data, thereby reducing a data size of the to-be-stored data, and reducing corresponding costs of hard disks, nodes, racks, sites, and operation and maintenance. In the computing device, after a user sets the compression algorithm, data compression is performed on all data based on the set compression algorithm, resulting in a low data compression rate.

SUMMARY

This application provides a data compression method and apparatus, a computing device, and a storage system, to improve a data compression rate.

According to a first aspect, a data compression method is provided. The method may be executed by a computing device, and specifically includes the following steps: When compressing to-be-compressed data, the computing device determines a compression feature value of the to-be-compressed data based on a parameter that affects a compression result of the to-be-compressed data, determines, based on the compression feature value, a compression policy for compressing the to-be-compressed data, and compresses the to-be-compressed data according to the compression policy to obtain compressed data, and stores the compressed data.

In this way, compared with a case in which the computing device compresses data with different features by using one compression algorithm, in the data compression method provided in this application, the compression policy used by the computing device is obtained based on selection of a feature that affects the compression result of the to-be-compressed data. The to-be-compressed data is compressed by using the compression policy that matches the feature of the to-be-compressed data, so that a data compression rate can be effectively improved.

In a possible implementation, the parameter includes a parameter of a hardware resource used when the to-be-compressed data is compressed and/or a parameter of a data feature that describes the to-be-compressed data. The parameter of the data feature includes at least one of a data type, a data block size, and distribution of characters included in the to-be-compressed data. The parameter of the hardware resource includes at least one of a usage ratio of a processor of the computing device, a network bandwidth between the computing device and a storage device when the compressed data is stored in the storage device, and an available storage capacity of the storage device.

In another possible implementation, the computing device stores correspondences between a plurality of compression feature values and compression policies. That determines, based on the compression feature value, a compression policy for compressing the to-be-compressed data includes: The computing device determines a compression feature value that is in the correspondences and that corresponds to the compression feature value of the to-be-compressed data; and determines, based on the compression feature value determined based on the correspondences, that a compression policy corresponding to the compression feature value is the compression policy for compressing the to-be-compressed data. Therefore, the correspondences between the plurality of compression feature values and the compression policies are preconfigured, so that when compressing the to-be-compressed data in real time, the computing device quickly and accurately selects the compression policy matching the feature of the to-be-compressed data.

The correspondences between the plurality of compression feature values and the compression policies may be obtained based on neural network training.

In another possible implementation, each compression policy includes a plurality of compression windows. That compresses the to-be-compressed data according to the compression policy includes: The computing device separately compresses the to-be-compressed data based on the plurality of compression windows to obtain a plurality of pieces of compressed data; and compares compression rates of the plurality of pieces of compressed data, and selects compressed data with a highest compression rate as the compressed data. It may be understood that the compression window is a range of searching for same character strings in the to-be-compressed data. The same character string in the to-be-compressed data is searched by using the plurality of different compression windows, and lengths of found same character strings may be different. Therefore, compressed data with different compression rates may be obtained. In this way, the to-be-compressed data is compressed by using multi-level elastic compression windows, to obtain compressed data with a highest compression rate possible.

In another possible implementation, after the compressed data is obtained, the method further includes: The computing device determines a compression rate of the compression policy used when data is compressed; and adjusts the compression feature value and a parameter of the compression policy in the correspondence based on the compression rate. Therefore, accuracy of the correspondences is improved by updating the compression policies in the correspondences, so that the computing device obtains a compression policy that better matches the feature of the to-be-compressed data, to improve a data compression rate.

According to a second aspect, a data compression apparatus is provided. The apparatus includes modules configured to perform the data compression method according to any one of the first aspect or the possible designs of the first aspect.

According to a third aspect, a computing device is provided. The computing device includes at least one processor and a memory, and the memory is configured to store a group of computer instructions. When the processor is used as the execution device according to any one of the first aspect or the possible implementations of the first aspect to execute the group of computer instructions, the processor performs operation steps of the data compression method according to any one of the first aspect or the possible implementations of the first aspect.

According to a fourth aspect, a storage system is provided. The storage system includes at least one computing node and at least one storage node. The computing node is configured to perform operation steps of the data compression method according to any one of the first aspect or the possible implementations of the first aspect to obtain compressed data. The storage node is configured to store the compressed data. Alternatively, the computing node transmits to-be-compressed data to the storage node. The storage node performs operation steps of the data compression method according to any one of the first aspect or the possible implementations of the first aspect to obtain compressed data, and stores the compressed data.

According to a fifth aspect, a computer-readable storage medium is provided, including computer software instructions. When the computer software instructions are run on a computing device, the computing device is enabled to perform operation steps of the method according to any one of the first aspect or the possible implementations of the first aspect.

According to a sixth aspect, a computer program product is provided. When the computer program product runs on a computer, a computing device is enabled to perform operation steps of the method according to any one of the first aspect or the possible implementations of the first aspect.

In this application, based on the implementations according to the foregoing aspects, the implementations may be further combined to provide more implementations.

BRIEF DESCRIPTION OF DRAWINGS

FIG. 4*a* and FIG. 4*b* are a schematic flowchart of a data compression method according to an embodiment of this application;

FIG. 5 is a schematic diagram of determining a compression feature value of to-be-compressed data according to an embodiment of this application;

FIG. 6 is a schematic diagram of a process of dictionary compression according to an embodiment of this application;

DESCRIPTION OF EMBODIMENTS

Data compression is a method for reorganizing to-be-compressed data based on a compression algorithm, to reduce redundant data in the to-be-compressed data, so as to reduce a data size of the to-be-compressed data, and reduce storage space required for storing the to-be-compressed data, thereby improving a compression rate, a transmission speed, and a compression speed of the to-be-compressed data. A specific form of a computing device for performing data compression is not limited in this application. The computing device is, for example, a mobile phone terminal, a tablet computer, a notebook computer, a virtual reality (VR) device, an augmented reality (augmented reality, AR) device, a mixed reality (MR) device, an extended reality (ER) device, or an in-vehicle terminal. Alternatively, the computing device may be an edge device (for example, a box carrying a chip having a processing capability), a server, a device having a computing capability in a distributed storage system, or a device having a computing capability in a centralized storage system.

Figure 1:
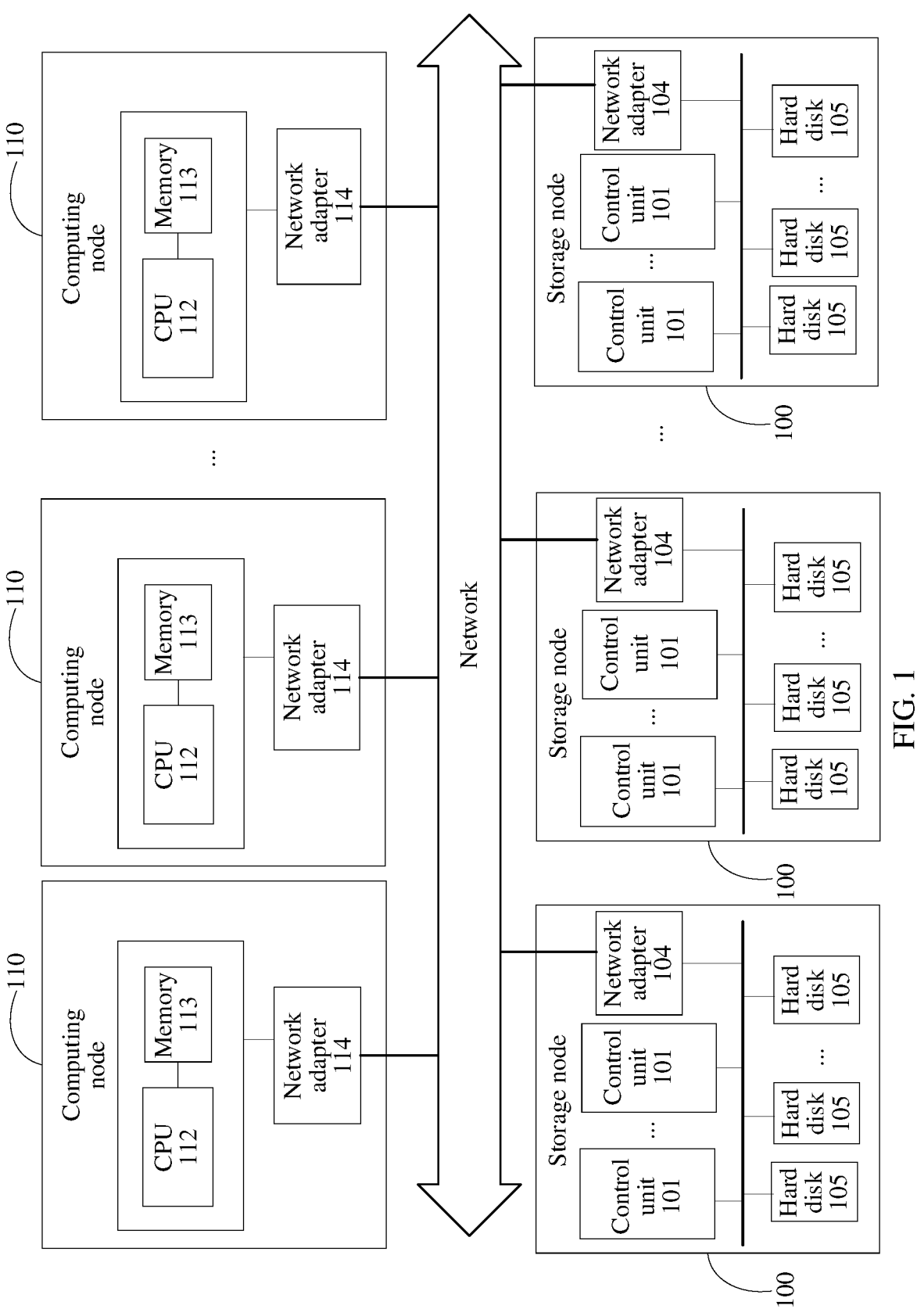
FIG. 1 is a schematic diagram of an architecture of a distributed storage system according to an embodiment of this application.

FIG. 1 is a schematic diagram of an architecture of a distributed storage system according to an embodiment of this application. As shown in FIG. 1, the distributed storage system provided in this embodiment includes a computing node cluster and a storage node cluster.

The computing node cluster includes one or more computing nodes 110. FIG. 1 shows three computing nodes 110, but is not limited to three computing nodes 110. The computing nodes 110 may communicate with each other over a network. The computing node 110 is a computing device. As a node and a hub of network data, the computing node is responsible for simultaneously providing information services for a plurality of clients or users in a network, such as a server and a computer.

In terms of hardware, as shown in FIG. 1, the computing node 110 includes at least a processor 112, a memory 113, and a network adapter 114. The processor 112 is a central processing unit (CPU) configured to process a data access request from outside the computing node 110 or a request generated inside the computing node 110.

For example, when receiving a write data request sent by a user, the processor 112 temporarily stores data in the write data request in the memory 113. When a total amount of the data in the memory 113 reaches a specific threshold, the processor 112 sends the data stored in the memory 113 to a storage node 100 for persistent storage. In addition, the processor 112 is further configured to perform computing or processing on the data, for example, perform metadata management, data deduplication, data compression, virtualizing storage space, and address translation.

FIG. 1 shows only one CPU 112. In actual application, one computing node 110 may have a plurality of CPUs 112, and one CPU 112 may have one or more CPU cores. A quantity of the CPU and a quantity of the CPU core are not limited in this embodiment.

The memory 113 is an internal memory that directly exchanges data with the processor. The memory can read and write the data at a high speed at any time. The memory serves as a temporary data memory of an operating system or another running program. The memory includes at least two types of memories. For example, the memory may be a random access memory, or may be a read-only memory (ROM). For example, the random access memory is a dynamic random access memory (DRAM), or a storage class memory (SCM).

The DRAM is a semiconductor memory, which is a volatile memory device like most random access memories (RAMs). The SCM relates to a composite storage technology that combines both a conventional storage apparatus feature and a memory feature. The storage class memory can provide a higher read and write speed than a hard disk, but an access speed of the storage class memory is slower than that of the DRAM and costs of the storage class memory are lower than that of the DRAM. However, the DRAM and the SCM are merely examples for description in this embodiment, and the memory may further include another random access memory, for example, a static random access memory (SRAM). For example, the read-only memory may be a programmable read-only memory (PROM), an erasable programmable read-only memory (EPROM), or the like.

In addition, the memory 113 may alternatively be a dual in-line memory module or a dual in-line memory module (DIMM), that is, a module formed by dynamic random access memories (DRAM), or may be a solid-state drive (SSD).

In an actual application, the computing node 110 may be provided with a plurality of memories 113 and memories 113 of different types. A quantity and a type of the memory 113 are not limited in this embodiment. In addition, the memory 113 may be configured to have a power loss protection function. The power loss protection function means that when the system is powered off and then powered on again, the data stored in the memory 113 is not lost. A memory with a power loss protection function is referred to as a non-volatile memory.

The network adapter 114 is configured to communicate with the storage node 100. For example, when the total amount of the data in the memory 113 reaches a specific threshold, the computing node 110 may send a request to the storage node 100 by using the network adapter 114, to perform persistent storage on the data. In addition, the computing node 110 may further include a bus for communication between internal components of the computing node 110. In terms of functions, because a main function of the computing node 110 in FIG. 1 is a computing service, and a remote memory may be used to implement persistent storage during storing data, the computing node 110 has fewer local memories than a conventional server, thereby reducing costs and saving space. However, this does not mean that the computing node 110 cannot have a local memory. During actual implementation, the computing node 110 may also have a small quantity of built-in hard disks or a small quantity of external hard disks. Any computing node 110 may access any storage node 100 in the storage node cluster over the network.

The storage node cluster may include a plurality of storage nodes 100. The storage nodes are configured to perform persistent storage on the data transmitted by the computing nodes. FIG. 1 shows three storage nodes 100, but is not limited to three storage nodes 100. For example, there may be more than three storage nodes, or there may be less than three storage nodes.

One storage node 100 includes one or more control units 101, a network adapter 104, and a plurality of hard disks 105. The network adapter 104 is configured to communicate with the computing node 110. The hard disk 105 is configured to store data, and may be a magnetic disk or a storage medium of another type, for example, a solid-state drive or a shingled magnetic recording hard disk. The control unit 101 is configured to write the data into the hard disk 105 or read the data from the hard disk 105 based on a read/write data request sent by the computing node 110. In a process of reading and writing data, the control unit 101 needs to convert an address carried in the read/write data request into an address that can be identified by the hard disk. Therefore, the control unit 101 also has some simple computing functions.

In actual application, the control unit 101 may have a plurality of forms. In one case, the control unit 101 includes a CPU and a memory. The CPU is configured to perform operations such as address translation and data reading and writing. The memory is configured to temporarily store data to be written into the hard disk 105, or read, from the hard disk 105, data to be sent to the computing node 110. In another case, there may be one, two, or more than two control units 101. When the storage node 100 includes at least two control units 101, there may be a homing relationship between the hard disk 105 and the control unit 101. When there is a homing relationship between the hard disk 105 and the control unit 101, each controller can only access a hard disk that belongs to the controller. Therefore, this usually relates to forwarding the read/write data request between the control units 101, resulting in a long data access path. In addition, if storage space is insufficient, when a new hard disk 105 is added to the storage node 100, a homing relationship between the hard disk 105 and the control unit 101 needs to be rebound, and an operation is complex, resulting in poor scalability of the storage space.

Therefore, in another implementation, a function of the control unit 101 may be offloaded to the network adapter 104. In other words, in the implementation shown in FIG. 1, the storage node 100 does not have the control unit 101, but the network adapter 104 completes the data reading and writing, the address translation, and other computing functions. In this case, the network adapter 104 is an intelligent network interface card. The intelligent network interface card may include a CPU and a memory. The CPU is configured to perform operations such as address translation and data reading and writing. The memory is configured to temporarily store data to be written into the hard disk 105, or read, from the hard disk 105, data to be sent to the computing node 110. There is no homing relationship between the network adapter 104 and the hard disk 105 in the storage node 100. The network adapter 104 may access any hard disk 105 in the storage node 100. Therefore, it is convenient to expand the hard disk when the storage space is insufficient.

Figure 2:
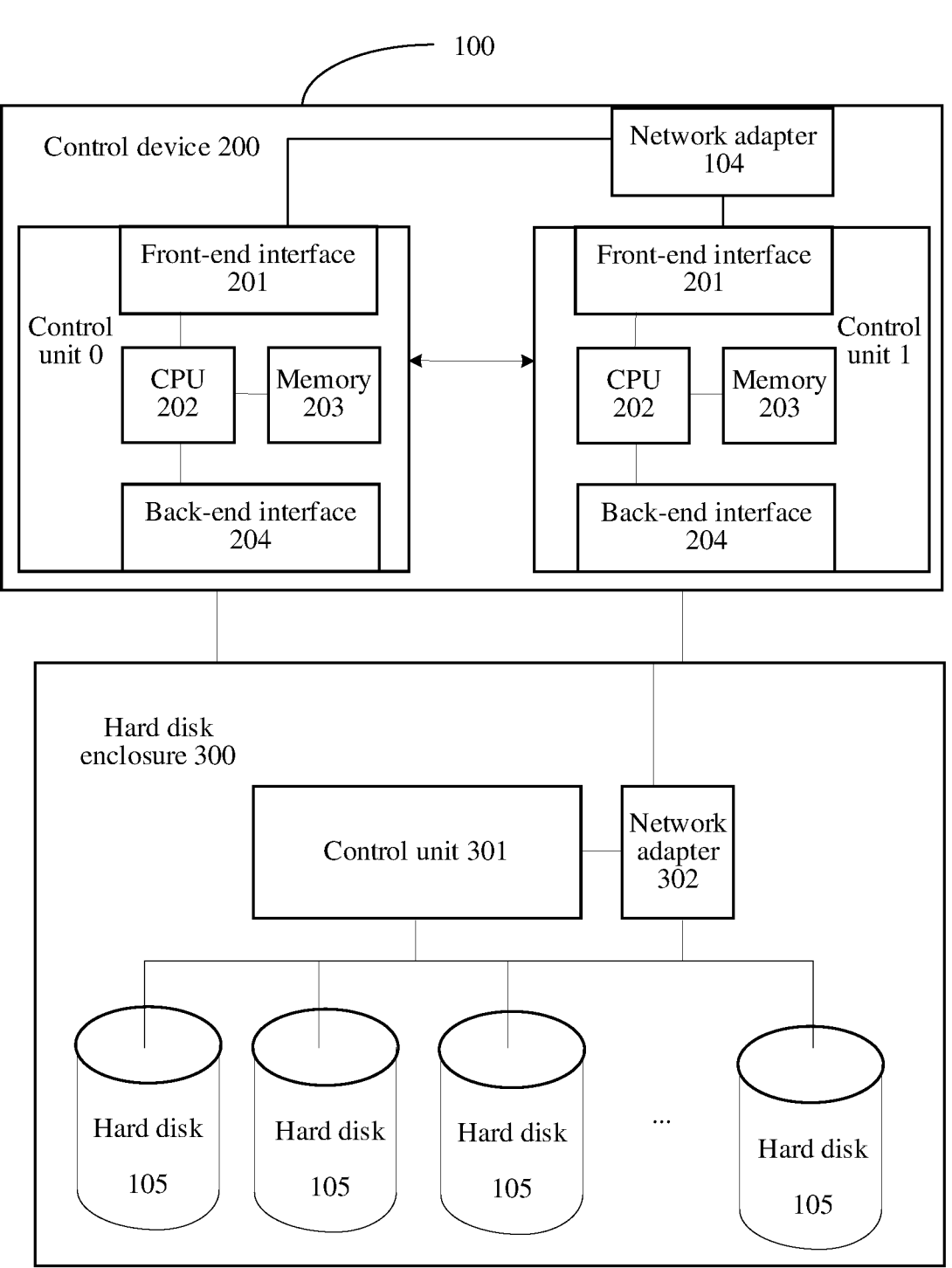
FIG. 2 is a schematic diagram of a structure in which a disk and a controller are separated according to an embodiment of this application.

A structure of the storage node shown in FIG. 1 is an architecture in which a disk and a controller are integrated. That is, the control unit and the hard disk 105 are included in a same physical device. However, in some embodiments, a structure of the storage node may alternatively be a structure in which a disk and a controller are separated. As shown in FIG. 2, two independent devices are used for controlling and storage. That is, a control device 200 and a hard disk enclosure 300 are connected to each other. The control device 200 includes a plurality of control units, for example, a control unit 0 and a control unit 1. The plurality of control units are connected to a computing node 110 by using a network adapter 104. Each control unit has a same structure. Using the control unit 0 as an example, the control unit 0 includes a front-end interface 201, a CPU 202, a memory 203, and a back-end interface 204. The front-end interface 201 is connected to the network adapter 104, to transmit data sent by the computing node by using the network adapter to the control unit 0. The back-end interface

204 is connected to the hard disk enclosure, to transmit data processed by the control unit 0 to the hard disk enclosure 300 for storage. The CPU 202 and the memory 203 are configured to process the data transmitted by the computing node 110 or data of a program run locally. For details, refer to descriptions of the CPU 112 and the memory 113 in the computing node 110. Details are not described herein again. As an independent device, the hard disk enclosure 300 further includes a control unit 301 in addition to a hard disk 105. The control unit 301 is configured to process the data transmitted by the computing node, store the processed data in the hard disk 105, and manage the hard disk 105.

Figure 3:
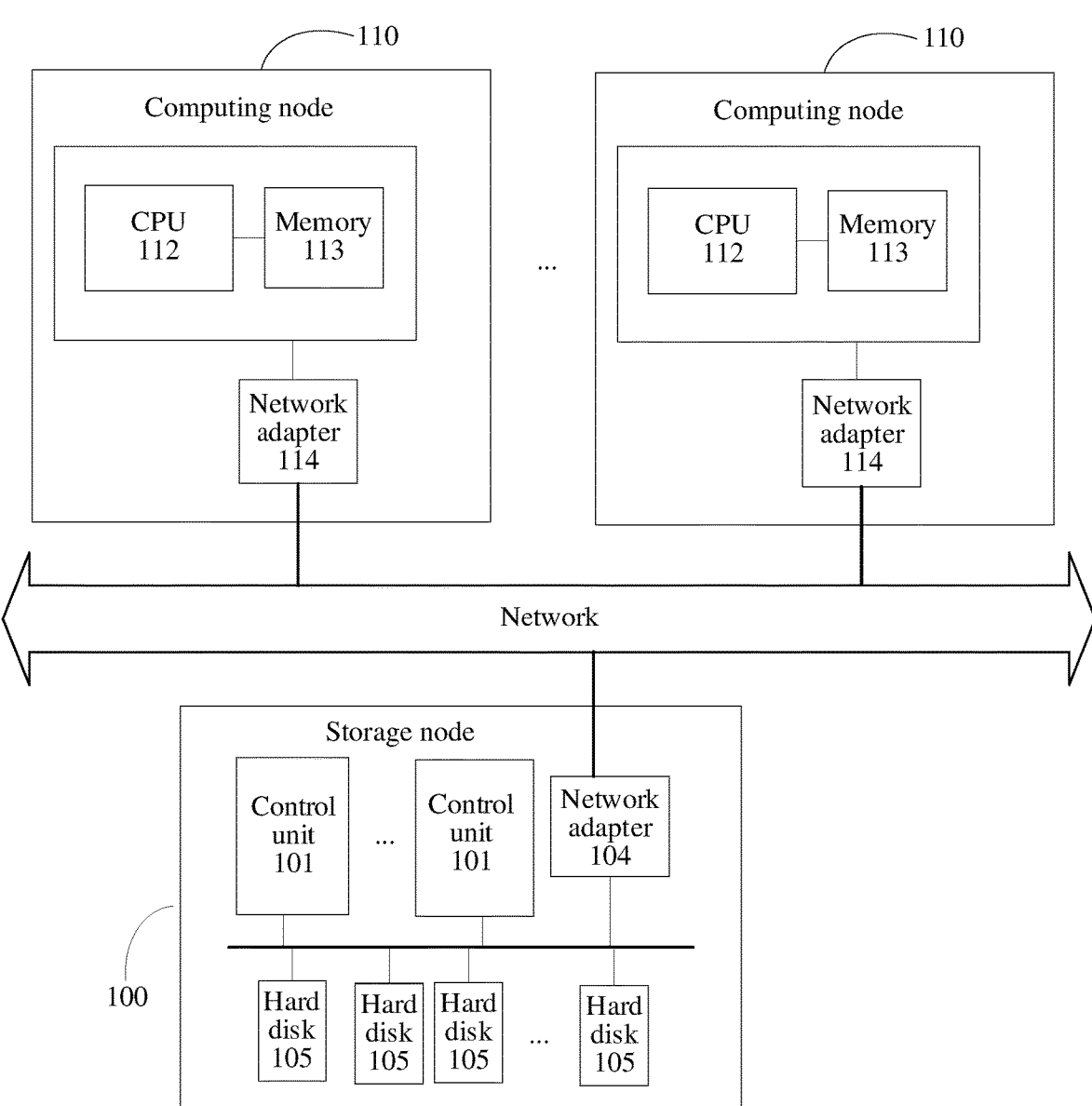
FIG. 3 is a schematic diagram of an architecture of a centralized storage system according to an embodiment of this application.

FIG. 1 is a diagram of the architecture of the distributed storage system. The solutions in embodiments of this application may be further applied to a centralized storage system. In the centralized storage system, data of a computing node is stored in a storage node, and the storage node may be, for example, a storage array. An architecture of the centralized storage system is shown in FIG. 3. Structures of a storage node 100 and a computing node 110 are the same as those in FIG. 1. Details are not described herein again. The storage node 100 shown in FIG. 3 is a structure in which a disk and a controller are integrated. In an integrated storage system, a structure of the storage node may alternatively be the structure in which the disk and the controller are separated shown in FIG. 2.

According to a data compression method provided in embodiments of this application, when a computing device compresses to-be-compressed data, the computing device determines a compression feature value of the to-be-compressed data based on a parameter that affects a compression result of the to-be-compressed data, adaptively determines a compression policy based on the compression feature value, and compresses the to-be-compressed data according to the compression policy to obtain compressed data. In this way, compared with a case in which the computing device compresses data with different features by using one compression algorithm, in the data compression method provided in this application, the compression policy used by the computing device is obtained based on selection of a feature that affects the compression result of the to-be-compressed data. The to-be-compressed data is compressed by using the compression policy that matches the feature of the to-be-compressed data, so that a data compression rate can be effectively improved, and a storage device can store more data, thereby improving storage space utilization of the storage device.

Figure 4B:
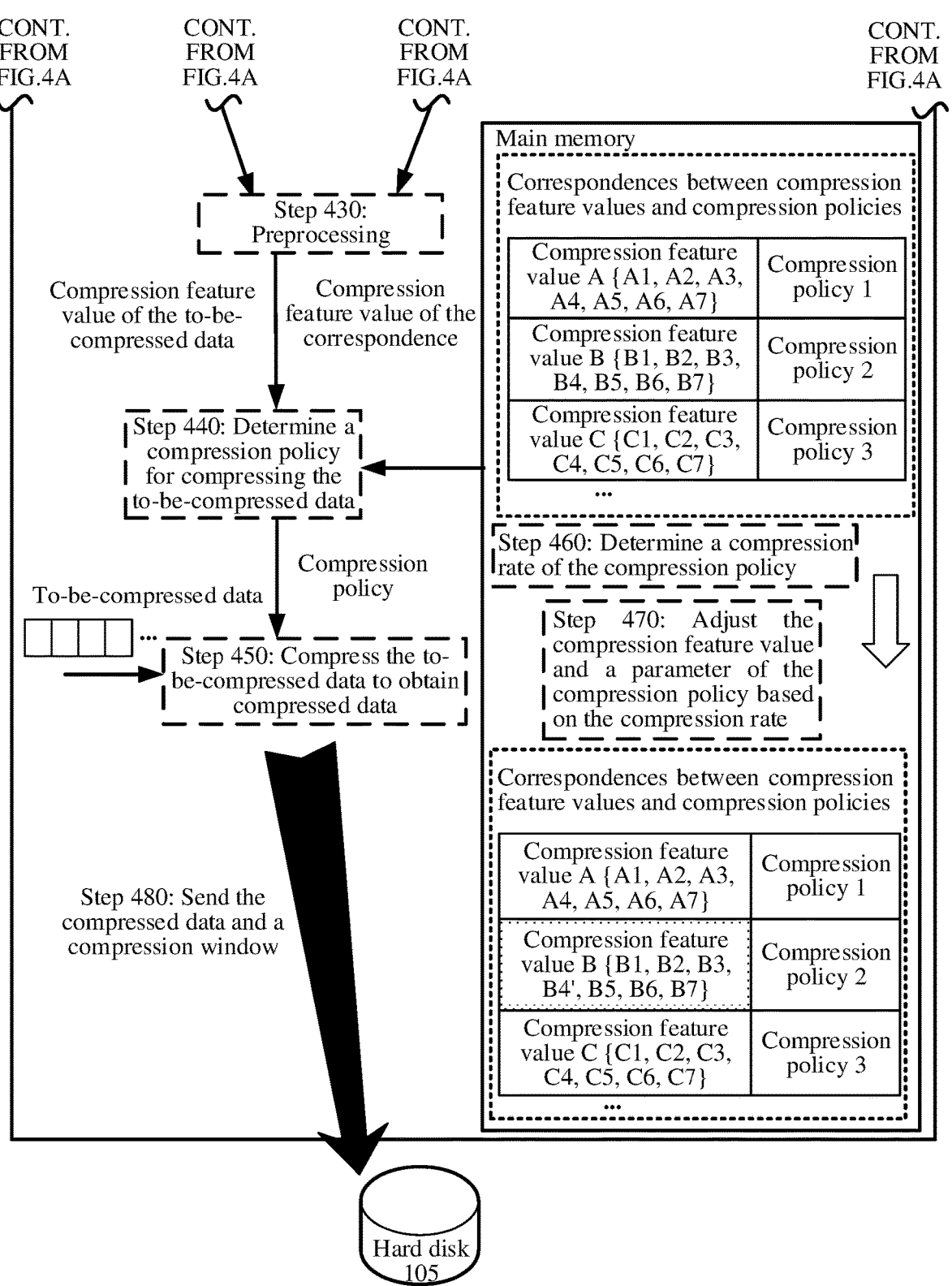

The following describes in detail the data compression method provided in embodiments of this application with reference to FIG. 4a to FIG. 8. FIG. 4a and FIG. 4b are a schematic flowchart of a data compression method according to an embodiment of this application. As shown in FIG. 4a and FIG. 4b, the method includes the following steps.

Step 410: A computing device obtains to-be-compressed data.

The computing device may receive the to-be-compressed data sent by an external device (for example, a keyboard, a mouse, a camera, and a voice receiver). Alternatively, the computing device runs an application to generate the to-be-compressed data. If the computing device is a storage device, the computing device may also receive, over a network, the to-be-compressed data sent by another computing device (for example, a server). The to-be-compressed data may be a text, a digit, a letter, an image, a voice, or the like.

Step 420: The computing device collects a parameter that affects a compression result of the to-be-compressed data.

The parameter that affects the compression result of the to-be-compressed data includes a parameter of a hardware resource used when the to-be-compressed data is compressed and/or a parameter of a data feature that describes the to-be-compressed data.

Before compressing the to-be-compressed data, the computing device collects, in a preset time period (for example, several seconds or tens of milliseconds), the parameter of the hardware resource used during the compression in real time. The parameter of the hardware resource includes at least one of hardware resources that affect the data compression result, such as a usage ratio of a processor of the computing device, a network bandwidth between the computing device and the storage device when compressed data is stored in the storage device, a bandwidth of the storage device, and an available storage capacity of the storage device.

The usage ratio of the processor indicates a busy/idle status of the processor. If the usage ratio of the processor is greater than or equal to a threshold, it indicates that the processor is in a busy state, and there are a large quantity of available computing resources. Otherwise, if the usage ratio of the processor is less than the threshold, it indicates that the processor is in an idle state, and there are a small quantity of available computing resources.

It may be understood that, to find as many same character strings as possible from the to-be-compressed data and improve a compression rate of the to-be-compressed data, a compression algorithm used by the computing device may be complex. If the computing device compresses the to-be-compressed data by using a compression algorithm with high complexity, the computing device needs to occupy a large quantity of computing resources. When the processor is in the busy state, if the computing device occupies a large quantity of computing resources to perform data compression, because there are a small quantity of available computing resources, a compression duration may be long. When the processor is in the idle state, because there are a large quantity of available computing resources, even if the computing device occupies a large quantity of computing resources to perform the data compression, the compression duration is short compared with that when the processor is in the busy state. Therefore, when the processor is in the busy state, the computing device may compress the to-be-compressed data by using a compression algorithm with low complexity, to shorten the compression duration as much as possible when ensuring a data compression rate. When the processor is in the idle state, the computing device may compress the to-be-compressed data by using a compression algorithm with high complexity, to improve the data compression rate as much as possible when ensuring the compression duration.

The computing device and the storage device may be two independent physical devices, for example, the computing node 110 or the storage node 100 in the distributed storage system shown in FIG. 1. The computing device transmits the compressed data to the storage device over the network. For example, the network is a storage area network (storage area network, SAN). The network bandwidth between the computing device and the storage device indicates an amount of data transmitted between the computing device and the storage device in a unit time (for example, one second). That the network bandwidth between the computing device and the storage device is large indicates that a large amount of data is transmitted between the computing device and the storage device in the unit time. That the network bandwidth between the computing device and the storage device is small indicates that a small amount of data is transmitted between the computing device and the storage device in the unit time.

It may be understood that, when the network bandwidth between the computing device and the storage device is small, if the computing device performs the data compression by using a compression algorithm with a high compression rate, because a data size of the compressed data is small, a transmission duration for transmitting the compressed data is short. When the network bandwidth between the computing device and the storage device is large, because a large amount of data is transmitted between the computing device and the storage device in the unit time, even if the data size of the compressed data is large, the transmission duration may be short when the network bandwidth is small. Therefore, when the network bandwidth between the computing device and the storage device is small, the computing device may compress the to-be-compressed data by using a compression algorithm with a high compression rate, to improve the data compression rate as much as possible when ensuring the transmission duration.

The bandwidth of the storage device indicates an amount of data accessed by the storage device in the unit time (for example, one second). It may be understood that, when the bandwidth of the storage device is small, if the computing device performs the data compression by using a compression algorithm with a high compression rate, because the data size of the compressed data is small, a duration for the storage device to access the compressed data is short. Therefore, when the bandwidth of the storage device is small, the computing device may compress the to-be-compressed data by using a compression algorithm with a high compression rate, to improve the data compression rate as much as possible when ensuring the access duration.

The available storage capacity of the storage device is remaining available storage space in the storage device used for storing the compressed data. It may be understood that a larger remaining available storage capacity of the storage device indicates that a larger amount of data can be stored. A smaller remaining available storage capacity of the storage device indicates that a smaller amount of data can be stored. When the remaining available storage capacity of the storage device is small, the computing device may compress the to-be-compressed data by using a compression algorithm with a high compression rate, to reduce the data size of the compressed data as much as possible, thereby improving storage space utilization of the storage device.

The computing device may analyze the to-be-compressed data to obtain the parameter of the data feature. The parameter of the data feature includes at least one of a data type, a data block size, and distribution of characters included in the to-be-compressed data.

The data type includes a text, a digit, a letter, and an image. It may be understood that repetition degrees of characters in data of different data types may be different. For example, the digit, the letter, and the image may include more repeated characters. The computing device may compress the to-be-compressed data by using a compression algorithm with high complexity, and find as many same character strings as possible, to improve the data compression rate.

The data block size is a unit data size for the computing device to perform the data compression. For example, the data block size ranges from eight kilobytes (KB) to 256 KB. The data block size may be preset by a system administrator. It may be understood that a smaller data block size indicates fewer same characters in a data block, and a larger data block size indicates more same characters in the data block. When the data block size is large, the computing device may compress the to-be-compressed data by using a compression algorithm with high complexity, and find as many same character strings as possible, to improve the data compression rate.

The distribution of the characters included in the to-be-compressed data indicates a distribution rule of the characters included in the to-be-compressed data. For example, the to-be-compressed data includes two characters a and b, and a distribution rule of a and b may be aaabbb, ababab, abbabb, or the like. It may be understood that, when the to-be-compressed data includes a large quantity of repeated characters, the computing device may compress the to-be-compressed data by using a compression algorithm with high complexity, and find as many same character strings as possible, to improve the data compression rate.

In actual application, a parameter that needs to be used may be determined based on a specific application scenario, and may only be at least one of parameters of the hardware resource, or may only be at least one of parameters that represent the data features, or the parameter of the hardware resource and the parameter of the data feature may be comprehensively considered. A specific parameter value may be a default value of the system, or may be set by a user as required.

Step 430: The computing device determines a compression feature value of the to-be-compressed data based on the parameter that affects the compression result of the to-be-compressed data.

Because dimension units of parameters collected by the computing device are usually different, to facilitate comprehensive consideration of impact of the parameters on the data compression result, the computing device may perform normalization processing on the parameters to obtain a parameter with a unified dimension. In some embodiments, the computing device may perform structured processing on the parameter to obtain the compression feature value of the to-be-compressed data. The compression feature value may be a feature vector. One element in the feature vector represents one parameter.

For example, $I_A$ represents a feature vector of the to-be-compressed data, and $I_A=[a_1, a_2, a_3, a_4, a_5, a_6, a_7]$. Element $a_1$ represents a usage ratio vector of the processor of the computing device. Element $a_2$ represents a network bandwidth vector between the computing device and the storage device. Element $a_3$ represents a bandwidth vector of the storage device. Element $a_4$ represents an available storage capacity vector of the storage device. Element $a_5$ represents a data type vector. Element $a_6$ represents a data block size vector. Element $a_7$ represents a distribution vector of the characters included in the to-be-compressed data.

Optionally, to improve accuracy of matching the compression feature value of the to-be-compressed data to be subsequently determined based on the parameter that affects the compression result of the to-be-compressed data with a compression policy, and eliminate redundant parameters, the computing device may further combine parameters having a common feature (for example, a same dimension unit). For example, the computing device may combine the network bandwidth between the computing device and the storage device and the bandwidth of the storage device.

The computing device stores correspondences between a plurality of compression feature values and compression policies. The computing device may calculate similarity between the compression feature value of the to-be-compressed data and each compression feature value in the correspondences, and determine a compression feature value with highest similarity in the correspondences as a compression feature value matching with the compression feature value of the to-be-compressed data.

In some embodiments, the computing device calculates Hamming distances between the compression feature value of the to-be-compressed data and each compression feature value in the correspondences, to obtain a plurality of Hamming distances. A shorter Hamming distance indicates that the compression feature value of the to-be-compressed data is more similar to the compression feature value in the correspondences. The computing device may compare the plurality of Hamming distances, and select a compression feature value with a shortest Hamming distance as the compression feature value determined based on the correspondences. The Hamming distance between the compression feature value of the to-be-compressed data and the compression feature value in the correspondences satisfies Equation (1).

$$D_{ham}(I_A, I_B) = \sum\nolimits_{i=1}^{n} a_i \oplus b_i \qquad \text{Equation (1)}$$

$I_A$ represents the compression feature value of the to-be-compressed data. $I_B$ represents the compression feature value in the correspondences. $a_i$ represents an element in the compression feature value of the to-be-compressed data. $b_i$ represents an element in the compression feature value in the correspondences. n represents a quantity of elements. $D_{ham}$ represents the Hamming distance between the compression feature value of the to-be-compressed data and the compression feature value in the correspondences.

In some other embodiments, the computing device may also calculate a Euclidean distance between the compression feature value of the to-be-compressed data and each compression feature value in the correspondences, to obtain a plurality of Euclidean distances. The computing device may compare the plurality of Euclidean distances, and select a compression feature value with a shortest Euclidean distance as the compression feature value determined based on the correspondences.

In some other embodiments, the computing device may select, from the plurality of Hamming distances or the plurality of Euclidean distances based on a preset distance range, a compression feature value determined based on the correspondences. If there are a plurality of compression feature values in the correspondences of the Hamming distances or the Euclidean distances within the preset range, the computing device may select, based on a nearest neighbor distance ratio, the compression feature value determined based on the correspondences, to improve precision of matching with the compression feature value in the correspondences. The nearest neighbor distance ratio satisfies Equation (2).

$$\frac{D_{ham}(I_A, I_{B1})}{D_{ham}(I_A, I_{B2})} < \beta \qquad \text{Equation (2)}$$

$\beta$ represents a threshold of the nearest neighbor distance ratio, and a value range of $\beta$ is 0 to 1. As shown in (a) in FIG. 5, a point $B_1$ and a point $B_2$ represent two different compression feature values in the correspondences. A point O represents the compression feature value of the to-be-compressed data, and within the preset distance range, Hamming distances or Euclidean distances between the point O and the point $B_1$ and between the point O the point $B_2$ are similar. As shown in (b) in FIG. 5, the computing device determined, based on Equation (2), that the compression feature value represented by the point $B_1$ is the compression feature value determined based on the correspondences.

In some other embodiments, the computing device may also calculate a normalized cross-correlation value between the compression feature value of the to-be-compressed data and each compression feature value in the correspondences, to obtain a plurality of normalized cross-correlation values. That the normalized cross-correlation value is closer to 1 indicates that the compression feature value of the to-be-compressed data is more similar to the compression feature value in the correspondences. That the normalized cross-correlation value is closer to 0 indicates that the compression feature value of the to-be-compressed data is less similar to the compression feature value in the correspondences. The computing device determines a compression feature value with a normalized cross-correlation value closest to 1 as the compression feature value determined based on the correspondences. The normalized cross-correlation value between the compression feature value of the to-be-compressed data and the compression feature value in the correspondences satisfies Equation (3).

$$NCC(I_A, I_B) = \sum\nolimits_{i=1}^{n} \frac{1}{S_a S_b}(a_i - u_a)(b_1 - u_b) \qquad \text{Equation (3)}$$

$NCC(I_A, I_B)$ represents the normalized cross-correlation value between the compression feature value of the to-be-compressed data and the compression feature value in the correspondences. $S_a$ represents a variance of the compression feature value of the to-be-compressed data. $S_b$ represents a variance of the compression feature value in the correspondences. $u_a$ represents an average value of the compression feature values of the to-be-compressed data. $u_b$ represents an average value of the compression feature values in the correspondences.

Step 440: The computing device determines, based on the compression feature value, a compression policy for compressing the to-be-compressed data.

The computing device determines a compression policy corresponding to the compression feature value determined based on the correspondences as the compression policy for compressing the to-be-compressed data.

It may be understood that the correspondences between the plurality of compression feature values and the compression policies are a preconfigured template library. To be specific, the template library includes a plurality of entries, and each entry includes a compression feature value and a compression policy corresponding to the compression feature value. In an example, a compression policy indicates a compression algorithm corresponding to a compression feature value. Different compression feature values in the template library correspond to different compression algorithms. The compression algorithm includes but is not limited to Shannon encoding, Huffman encoding, and a dictionary compression algorithm (for example, LZ77, LZSS, LZ78, and LZW). In another example, a compression policy indicates a parameter of a compression algorithm corresponding to a compression feature value, for example, a size of a dictionary area in a dictionary compression algorithm. Different compression feature values in the template library correspond to different parameters of a same compression algorithm.

The compression policy corresponding to the compression feature value in the correspondences is configured based on an impact of the parameter of the hardware resource and the parameter of the data feature on the compression rate described in step 420. That is, the compression algorithm or the parameter of the compression algorithm indicated by the compression policy corresponding to the compression feature value in the correspondences is set based on a principle of a highest possible compression rate.

For example, the compression feature value is the usage ratio of the processor. If the usage ratio of the processor is less than the threshold, a compression policy corresponding to the usage ratio of the processor indicates a dictionary compression algorithm for a long dictionary area. If the usage ratio of the processor is greater than or equal to the threshold, the compression policy corresponding to the usage ratio of the processor indicates a dictionary compression algorithm for a short dictionary area.

For another example, the compression feature value is a remaining available storage capacity of the storage device. If the remaining available storage capacity of the storage device is small, a compression policy corresponding to the remaining available storage capacity of the storage device indicates the dictionary compression algorithm for the long dictionary area. If the remaining available storage capacity of the storage device is large, a compression policy corresponding to the remaining available storage capacity of the storage device indicates the dictionary compression algorithm for the short dictionary area.

For another example, the compression feature value is the network bandwidth between the computing device and the storage device or the bandwidth of the storage device. If the network bandwidth or the bandwidth of the storage device is small, the compression policy corresponding to the remaining available storage capacity of the storage device indicates the dictionary compression algorithm for the long dictionary area.

For another example, the compression feature value is the data block size. If the data block size is large, the compression policy corresponding to the remaining available storage capacity of the storage device indicates the dictionary compression algorithm for the long dictionary area.

For another example, the compression feature value is the distribution of the characters included in the to-be-compressed data. If the to-be-compressed data includes more repeated characters, the compression policy corresponding to the remaining available storage capacity of the storage device indicates the dictionary compression algorithm for the long dictionary area.

In some embodiments, the compression policy corresponding to the compression feature value may be configured by comprehensively considering the parameter of the hardware resource and the parameter of the data feature, to improve a compression rate of the to-be-compressed data.

For example, the compression feature value includes the usage ratio of the processor and the network bandwidth between the computing device and the storage device. Assuming that the usage ratio of the processor being greater than or equal to the threshold indicates that there are few computing resources available for the processor, and the network bandwidth between the computing device and the storage device being large indicates that there is a large amount of data transmitted between the computing device and the storage device in the unit time, the compression policy corresponding to the compression feature value indicates the dictionary compression algorithm for the short dictionary area. The computing device compresses the to-be-compressed data by using the dictionary compression algorithm for the short dictionary area, and the computing device may occupy few computing resources, so that the compression duration is shortened as much as possible when ensuring the data compression rate. Because the network bandwidth between the computing device and the storage device is large, the computing device may also transmit the compressed data quickly.

For another example, the compression feature value includes the usage ratio of the processor and the available storage capacity of the storage device. Assuming that the usage ratio of the processor is less than the threshold, and the available storage capacity of the storage device is small, the compression policy corresponding to the compression feature value indicates the dictionary compression algorithm for the long dictionary area. Because the processor has a large quantity of available computing resources, the computing device may compress the to-be-compressed data by using the dictionary compression algorithm for the long dictionary area, to reduce the data size of the compressed data as much as possible, thereby saving storage space of the storage device, and improving storage space utilization of the storage device.

For another example, the compression feature value includes the usage ratio of the processor and the distribution of the characters included in the to-be-compressed data. Assuming that the usage ratio of the processor is less than the threshold, and the to-be-compressed data includes a large quantity of repeated characters, the compression policy corresponding to the compression feature value indicates the dictionary compression algorithm for the long dictionary area. Because the processor has a large quantity of available computing resources, the computing device may compress the to-be-compressed data by using the dictionary compression algorithm for the long dictionary area, and find as many same character strings as possible, to reduce the data size of the compressed data as much as possible, thereby improving the data compression rate.

For another example, the compression feature value includes the usage ratio of the processor, the available storage capacity of the storage device, and the distribution of the characters included in the to-be-compressed data. Assuming that the usage ratio of the processor is less than the threshold, the available storage capacity of the storage device is small, and the to-be-compressed data includes a large quantity of repeated characters, the compression policy corresponding to the compression feature value indicates the dictionary compression algorithm for the long dictionary area. Because the processor has a large quantity of available computing resources, and the to-be-compressed data includes a large quantity of repeated characters, the computing device may compress the to-be-compressed data by using the dictionary compression algorithm for the long dictionary area, to reduce the data size of the compressed data as much as possible, thereby saving storage space of the storage device, and improving storage space utilization of the storage device.

In actual application, when the compression policy corresponding to the compression feature value is configured based on the compression feature value, at least one of parameters of the hardware resource may be focused on, or at least one of parameters of the data feature may be focused on, or the parameter of the hardware resource and the parameter of the data feature may be comprehensively considered.

Therefore, because the compression policy is configured based on the impact of the parameter of the hardware resource and the parameter of the data feature on the compression result of to-be-compressed data, that is, the compression algorithm or the parameter of the compression algorithm indicated by the compression policy corresponding to the compression feature value in the correspondences is set based on the principle of a highest possible compression rate, the computing device selects, from the correspondences, a compression policy corresponding to a compression feature value similar to the compression feature value of the to-be-compressed data, and the compression policy is used to compress the to-be-compressed data, so that the data compression rate can be effectively improved.

It should be noted that the correspondences may be preconfigured by the system administrator based on experience. Alternatively, the correspondences may be obtained on neural network training. For example, the computing device marks the compression policy corresponding to the compression feature value, inputs the compression feature value and the marked compression policy into a neural network, and perform training on the neural network until a loss function in the neural network converges. When a value of the loss function is less than a specific threshold, the neural network training is completed, so that the neural network has a function of predicting the compression policy based on the compression feature value, to achieve prediction precision. The computing device inputs the compression feature value of the to-be-compressed data into the trained neural network, and the compression policy of the compression feature value of the to-be-compressed data may be obtained. It should be noted that a computing device for training the neural network and the computing device for determining the compression policy for compressing the to-be-compressed data may be a same device or may be different devices, which is not limited.

Step 450: The computing device compresses the to-be-compressed data according to the compression policy to obtain the compressed data.

The compression policy may be the dictionary compression algorithm. A basic idea of the dictionary compression algorithm is to replace original data in the to-be-compressed data with location information to implement compression, and restore the data based on the location information during decompression. Specifically, the dictionary compression algorithm is to search the dictionary area for character strings in a to-be-encoded area, obtain a longest character string matching the to-be-encoded area, and return a distance between a start character of the longest character string and a boundary between the dictionary area and the to-be-encoded area, and a match length (literal length) of a matching character string. Then, a compression window is shifted rightwards by the match length plus one character, and the searching continues until encoding of the to-be-encoded data is completed, to achieve an objective of data compression. An output of the dictionary compression algorithm is a 3-tuple (offset, match length, character (char)). The offset represents an offset distance of the longest character string. The offset may be a distance between the longest character string and a left section of the dictionary area or a distance between the longest character string and a right section of the dictionary area (the boundary between the dictionary area and the to-be-encoded area). The match length indicates a length of the matching character string. The character indicates a next character after matching.

The following describes a specific process of dictionary compression by using an example. For example, it is assumed that the to-be-encoded data is aacaacabcabaaac. The size of the dictionary area is six characters, and a size of the to-be-encoded area is four characters. A dictionary is generated dynamically. When the encoding starts, the dictionary is null, and the dictionary includes different characters during an encoding process.

As shown in (a) in FIG. 6, the encoding starts, and a left end of the to-be-encoded area is aligned with a left end (the boundary between the dictionary area and the to-be-encoded) of the to-be-encoded data. The to-be-encoded area includes a character aaca, the dictionary is null, and there is no character matching the character in the dictionary. In this case, the offset is 0, and the match length is 0. Because no same character is matched, the character in the 3-tuple is a first character a of the to-be-encoded data. Therefore, an output 3-tuple is <0, 0, a>.

As shown in (b) in FIG. 6, the compression window is moved rightwards by the len (the match length is 0) plus one character. In this case, the dictionary area includes a character a. The to-be-encoded area includes a character acaa. If the longest character string matched in the dictionary area and the to-be-encoded area is a, and the matching character string is a. In this case, the offset is 1, the match length is 1, and the next character after the matching is c. Therefore, the output 3-tuple is <1, 1, c>.

As shown in (c) in FIG. 6, the compression window is moved rightwards by the len (the match length is 1) plus one character, that is, the compression window is moved rightwards by two characters. In this case, the dictionary area includes a character aac. The to-be-encoded area includes a character aaca. If the longest character string matched in the dictionary area and the to-be-encoded area is aac, and the matching character string is aaca. In this case, the offset is 3, the match length is 4, and the next character after the matching is b. Therefore, the output 3-tuple is <3, 4, b>.

As shown in (d) in FIG. 6, the compression window is moved rightwards by the len (the match length is 4) plus one character, that is, the compression window is moved rightwards by five characters. In this case, the dictionary area includes a character caacab. The to-be-encoded area includes a character caba. If the longest character string matched in the dictionary area and the to-be-encoded area is cab, and the matching character string is cab. In this case, the offset is 3, the match length is 3, and the next character after the matching is a. Therefore, the output 3-tuple is <3, 3, a>.

As shown in (e) in FIG. 6, the compression window is moved rightwards by the len (the match length is 3) plus one character, that is, the compression window is moved rightwards by four characters. In this case, the dictionary area includes a character abcaba. The to-be-encoded area includes a character aac. If the longest character string matched in the dictionary area and the to-be-encoded area is a, and the matching character string is aa. In this case, the offset is 1, the match length is 2, and the next character after the matching is c. Therefore, the output 3-tuple is <1, 2, c>.

As shown in (f) in FIG. 6, the compression window is moved rightwards by the len (the match length is 2) plus one character, that is, the compression window is moved rightwards by three characters. In this case, the dictionary area includes a character abaaac. The to-be-encoded area includes null characters, and the encoding is complete.

Therefore, after the computing device compresses to-be-encoded data aacaacabcabaaac by using the dictionary compression algorithm, an obtained 3-tuple sequence includes <0, 0, a>, <1, 1, c>, <3, 4, b>, <3, 3, a>, and <1, 2, c>.

Figure 7:
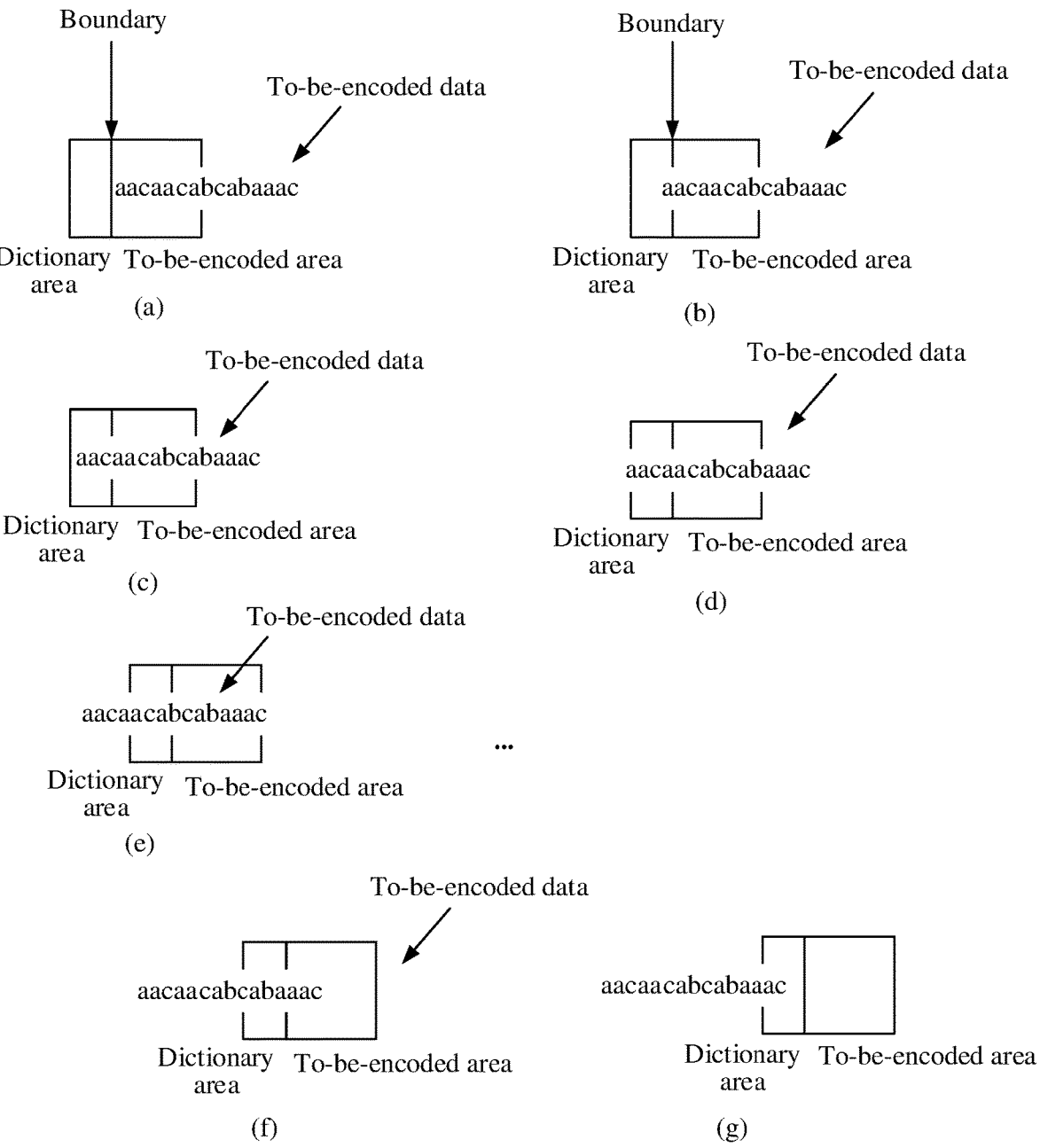
FIG. 7 is a schematic diagram of a process of dictionary compression according to an embodiment of this application.

As a length of the dictionary area varies, the dictionary area may also include different characters. In this case, the matching character strings found in the dictionary compression process are also different. For example, FIG. 7 is a schematic diagram of another process of the dictionary compression according to an embodiment of this application. The length of the dictionary area is changed from six characters to two characters. (a) and (b) in FIG. 7 refer to descriptions of (a) and (b) in FIG. 6.

As shown in (c) in FIG. 7, the compression window is moved rightwards by the len (the match length is 1) plus one character, that is, the compression window is moved rightwards by two characters. In this case, the dictionary area includes a character ac. The to-be-encoded area includes a character aaca. If there is no character matching the character in the dictionary, and the longest character string matched in the dictionary area and the to-be-encoded area is 0. In this case, the offset is 0, the match length is 0, and the next character after the matching is a. Therefore, the output 3-tuple is <0, 0, a>.

As shown in (d) in FIG. 7, the compression window is moved rightwards by the len (the match length is 0) plus one character, that is, the compression window is moved rightwards by one character. In this case, the dictionary area includes a character ca. The to-be-encoded area includes a character acba. If the longest character string matched in the dictionary area and the to-be-encoded area is a, and the matching character string is a. In this case, the offset is 1, the match length is 1, and the next character after the matching is c. Therefore, the output 3-tuple is <1, 1, c>.

As shown in (e) in FIG. 7, the compression window is moved rightwards by the len (the match length is 1) plus one character, that is, the compression window is moved rightwards by two characters. In this case, the dictionary area includes a character ac. The to-be-encoded area includes a character abca. If there is no character matching the character in the dictionary, and the longest character string matched in the dictionary area and the to-be-encoded area is 0. In this case, the offset is 0, the match length is 0, and the next character after the matching is a. Therefore, the output 3-tuple is <0, 0, a>.

There is no character matching a character bcaba following aacacac in the dictionary. The longest character string matched in the dictionary area and the to-be-encoded area is 0, the offset is 0, the match length is 0, and the output 3-tuple includes <0, 0, b>, <0, 0, c>, <0, 0, a>, <0, 0, b>, <0, 0, a>.

As shown in (f) in FIG. 7, the compression window is moved rightwards by the len (the match length is 0) plus one character, that is, the compression window is moved rightwards by one character. In this case, the dictionary area includes a character ba. The to-be-encoded area includes a character aac. If the longest character string matched in the dictionary area and the to-be-encoded area is a, and the matching character string is aa. In this case, the offset is 1, the match length is 2, and the next character after the matching is c. Therefore, the output 3-tuple is <1, 2, c>.

As shown in (g) in FIG. 7, the compression window is moved rightwards by the len (the match length is 2) plus one character, that is, the compression window is moved rightwards by three characters. In this case, the dictionary area includes a character ac. The to-be-encoded area includes null characters, and the encoding is complete.

Therefore, after the computing device compresses to-be-encoded data aacaacabcabaaac by using the dictionary compression algorithm, an obtained 3-tuple sequence includes <0, 0, a>, <1, 1, c>, <0, 0, a>, <1, 1, c>, <0, 0, a>, <0, 0, b>, <0, 0, c>, <0, 0, a>, <0, 0, b>, <0, 0, a>, and <1, 2, c>.

It can be learned from FIG. 6 and FIG. 7 that compressed data obtained by the encoding based on the size of the dictionary area being a length of six characters includes five 3-tuples, and compressed data obtained by the encoding based on the size of the dictionary area being a length of two characters includes 11 3-tuples. A smaller dictionary area indicates a lower compression rate. The computing device selects, based on the compression rates in FIG. 6 and FIG. 7, a compression window as six characters, and the compressed data is <0, 0, a>, <1, 1, c>, <3, 4, b>, <3, 3, a>, and <1, 2, c>.

It may be understood that, if the dictionary area is smaller and the dictionary includes fewer characters, the computing device finds fewer characters that match the dictionary area in the to-be-encoded area, and the compression rate is lower. If the dictionary area is larger and the dictionary includes more characters, the computing device may find more characters that match the dictionary area in the to-be-encoded area, and the compression rate is higher. However, the computing device needs to take longer time in searching for repeated characters, resulting in a slow compression speed and affecting system performance.

In some embodiments, the compression policy may indicate at least two compression algorithms, so that the computing device selects, from the at least two compression algorithms, a compression algorithm with a highest compression rate to compress the to-be-compressed data. Alternatively, the compression policy may indicate values of a plurality of parameters in the compression algorithms, so that the computing device selects, from the values of the plurality of parameters, a value of a parameter of a compression algorithm with a highest compression rate to compress the to-be-compressed data.

For example, the compression policy may further include a plurality of compression windows. The compression window is a dictionary area in a dictionary compression algorithm. The compression policy includes a plurality of dictionary areas of different sizes. The computing device separately compresses the to-be-compressed data based on the plurality of compression windows to obtain a plurality of pieces of compressed data; and compares compression rates of the plurality of pieces of compressed data, and selects compressed data with a highest compression rate as the compressed data. Therefore, after compressing the to-be-compressed data by using the plurality of compression windows of different sizes, the computing device uses the compressed data with the highest compression rate as the compressed data, thereby further improving a data compression rate.

In some other embodiments, the computing device may further divide the to-be-compressed data into a plurality of to-be-compressed data blocks based on the data block size, and compress each to-be-compressed data block according to the data compression method provided in embodiments of this application. Compared with compressing the to-be-compressed data as a whole, the data compression rate can be further improved.

In some other embodiments, the computing device may divide the to-be-compressed data based on the data block size to obtain the to-be-compressed data block, and store a hash value in the dictionary area after performing a hash operation on the to-be-compressed data block. The computing device matches the hash value in the dictionary area based on a hash value of the to-be-compressed data block, and performs compression if the matching succeeds, or stores a new hash value in the dictionary area if the matching fails. Because a harsh operation may be performed on different to-be-compressed data blocks by using different hash algorithms, compared with performing hashing on the to-be-compressed data by using one hash algorithm, probability of hash collision is effectively reduced.

Optionally, the compression policy may further indicate whether to compress the compressed data again. For example, the compression policy includes a re-compression identifier. If a value of the re-compression identifier is 1, it indicates that the compression is performed again. If a value of the re-compression identifier is 0, it indicates that the compression is not performed again. The computing device may perform entropy coding on the compressed data, to further improve the data compression rate.

Optionally, after obtaining the compressed data, the computing device may further adjust the compression feature value and a parameter of the compression policy in the correspondence, to improve accuracy of the correspondences. For example, the method further includes step 460 and step 470.

Step 460: The computing device determines a compression rate of the compression policy used when data is compressed.

Compression rate is an effect name that describes a compressed file. The compression rate may be a ratio of a size of the compressed data to a size of data before the compression. The compression rate of the compression policy determined by the computing device and used when the data is compressed may be a ratio of a data size of the compressed data to a data size of the to-be-compressed data. Generally, a smaller compression rate indicates a smaller data size of the compressed data. For example, the size of the data before the compression is 100 megabytes (MB), the size of the data before the compression is 90 MB, and the compression rate is 90/100*100%=90%.

Step 470: The computing device adjusts the compression feature value and the parameter of the compression policy based on the compression rate.

If the compression rate of the compression policy used when the to-be-compressed data is compressed is still low, the computing device may also adjust, based on the compression rate, the parameter of the compression policy used when the data is compressed. In this way, the compression policy is configured more appropriately for a real-time feature of a scenario, so that the compression policy used when the data is compressed achieves an optimal compression rate effect. For example, if the usage ratio of the processor is less than the threshold, the compression rate of the compression policy is low, and the computing device may increase the size of the dictionary area. If the usage ratio of the processor is greater than or equal to the threshold, the network bandwidth between the computing device and the storage device is large, and the compression rate is high, the computing device may reduce the size of the dictionary area.

The computing device may adjust the compression feature values in the correspondences as a whole, that is, adjust each element in a compression feature vector. The computing device may also adjust some elements in the compression feature vector. The computing device may further retain a historical vector of a same element to form a chain structure, to improve reliability of updating the compression policy. For example, the computing device averages a historical value and a current value of elements (for example, the usage ratio of the processor, the network bandwidth between the computing device and the storage device, the bandwidth of the storage device, the available storage capacity of the storage device, the data type, the data block size, or the distribution of the characters included in the to-be-compressed data) in the compressed feature vector, and determines the average value as an updated value.

The computing device compresses the to-be-compressed data to obtain the compressed data, and stores the compressed data in the storage device. For example, the method further includes step 480.

Step 480: The computing device sends the compressed data and the compression window to the storage device.

Figure 8:
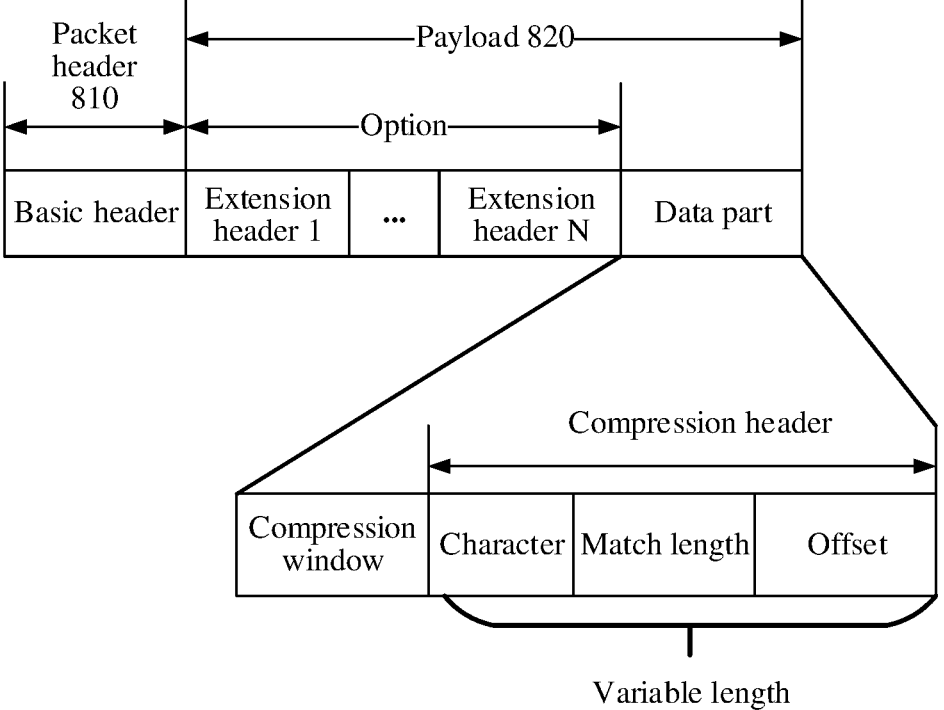
FIG. 8 is a schematic diagram of a structure of a data packet according to an embodiment of this application.

The computing device may send a data packet to the storage device (for example, the hard disk 105). The data packet includes the compressed data and a compression window used for compressing the to-be-compressed data. As shown in FIG. 8, the data packet may include a packet header 810 and a payload 820. The packet header 810 includes a basic header, that is, an address required for transmitting the data packet. The payload 820 includes an extension header and data needed to be transmitted. The computing device may incorporate an offset into a compression header. The compression header includes a 3-tuple and a compression window of the compressed data. The compression header may be located in the payload 820 of the data packet. For example, the computing device selects, based on the compression rates in FIG. 6 and FIG. 7, a compression window as six characters, and the compressed data is <0, 0, a>, <1, 1, c>, <3, 4, b>, <3, 3, a>, and <1, 2, c>.

In some embodiments, the computing device may dynamically adjust, based on the length of the compressed data, a total length of bits occupied by the compression header. That is, a quantity of the bits of the offset, the match length, and the character can be dynamically adjusted. In different data types (for example, a special character, a Chinese character, and an English character), a bit length of each 3-tuple in the compression header is dynamically adjusted. Compared with a compression header with a fixed length, each byte in the compression header can be fully used, to increase the data compression rate.

After reading compression header data from the storage device, the computing device may determine, based on the compression window included in the compression header, a size of a compression window used by the computing device during the compression, and decode, based on the compression window, the 3-tuple of the compressed data to obtain original to-be-compressed data.

It may be understood that, to implement functions in the foregoing embodiments, the computing device includes a corresponding hardware structure and/or a software module for performing each function. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

The foregoing describes in detail the data compression method provided in this embodiment with reference to FIG. 1 to FIG. 8. The following describes a data compression apparatus provided in this embodiment with reference to FIG. 9.

Figure 9:
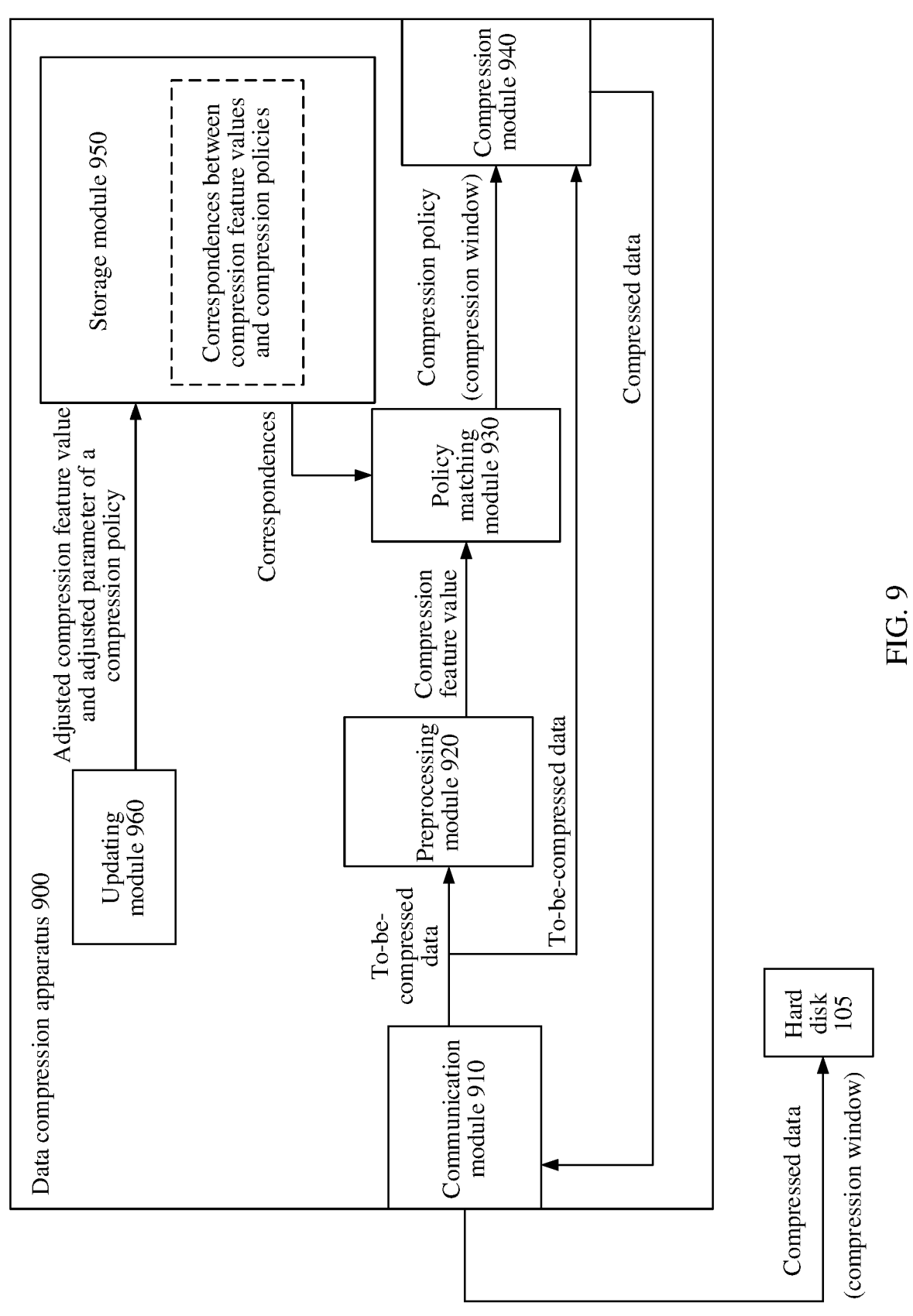
FIG. 9 is a schematic diagram of a structure of a data compression apparatus according to an embodiment of this application.

FIG. 9 is a schematic diagram of a structure of a possible data compression apparatus according to an embodiment. The data compression apparatus may be configured to implement a function of the computing device in the foregoing method embodiments. Therefore, the data compression apparatus can also achieve beneficial effects of the foregoing method embodiments. In this embodiment, the data compression apparatus may be the computing node 110 or the storage node 100 shown in FIG. 1 to FIG. 3, or may be a module (for example, a chip) applied to a server.

As shown in FIG. 9, a data compression apparatus 900 includes a communication module 910, a preprocessing module 920, a policy matching module 930, a compression module 940, and a storage module 950. The data compression apparatus 900 is configured to implement a function of the computing device in the method embodiment shown in FIG. 4a and FIG. 4b.

The communication module 910 is configured to obtain to-be-compressed data, and transmit compressed data and a compression window to a hard disk 105. For example, the communication module 910 is configured to perform step 410 and step 480 in FIG. 4a and FIG. 4b.

The preprocessing module 920 is configured to obtain a parameter that affects a compression result of to-be-compressed data, and determine a compression feature value of the to-be-compressed data based on the parameter that affects the compression result of the to-be-compressed data. For example, the preprocessing module 920 is configured to perform step 420 and step 430 in FIG. 4a and FIG. 4b.

The policy matching module 930 is configured to determine, based on the compression feature value, a compression policy for compressing the to-be-compressed data. For example, the policy matching module 930 is configured to perform step 440 in FIG. 4b.

The parameter includes a parameter of a hardware resource used when the to-be-compressed data is compressed and/or a parameter of a data feature that describes the to-be-compressed data. The parameter of the data feature includes at least one of a data type, a data block size, and distribution of characters included in the to-be-compressed data. The parameter of the hardware resource includes at least one of a usage ratio of a processor of the computing device, a network bandwidth between the computing device and a storage device when the compressed data is stored in the storage device, and an available storage capacity of the storage device.

The compression module 940 is configured to compress the to-be-compressed data according to the compression policy to obtain compressed data. For example, the compression module 940 is configured to perform step 450 in FIG. 4b.

The policy matching module 930 is specifically configured to determine a compression feature value that is in correspondences and that corresponds to the compression feature value of the to-be-compressed data, and determine, based on the compression feature value determined based on the correspondences, that a compression policy corresponding to the compression feature value is the compression policy for compressing the to-be-compressed data.

The compression module 940 is specifically configured to: separately compress the to-be-compressed data based on a plurality of compression windows to obtain a plurality of pieces of compressed data; and compare compression rates of the plurality of pieces of compressed data, and select compressed data with a highest compression rate as the compressed data. The compression policy includes the plurality of compression windows.

The storage module 950 is configured to store the correspondences between a plurality of compression feature values and compression policies.

The data compression apparatus 900 further includes an updating module 960. The updating module 960 is configured to: determine a compression rate of the compression policy used when data is compressed; and adjust the compression feature value and a parameter of the compression policy in the correspondence based on the compression rate, to obtain an adjusted compression feature value and an adjusted parameter of the compression policy, and store the adjusted compression feature value and the adjusted parameter of the compression policy in the storage module 950. For example, the updating module 960 is configured to perform step 460 and step 470 in FIG. 4b.

It should be understood that the data compression apparatus 900 in this embodiment of this application may be implemented by using an ASIC, or a programmable logic device (PLD). The PLD may be a complex programmable logic device (CPLD), a field-programmable gate array (FPGA), a generic array logic (GAL), or any combination thereof. When the data compression method shown in FIG. 4a and FIG. 4b may be implemented by using software, the data compression apparatus 900 and modules of the data compression apparatus may alternatively be software modules.

The data compression apparatus 900 according to this embodiment of this application may correspondingly perform the method described in embodiments of this application. The foregoing and another operation and/or function of the units in the data compression apparatus 900 are respectively configured to implement corresponding procedures of the method in FIG. 4a and FIG. 4b. For brevity, details are not described herein again.

Figure 10:
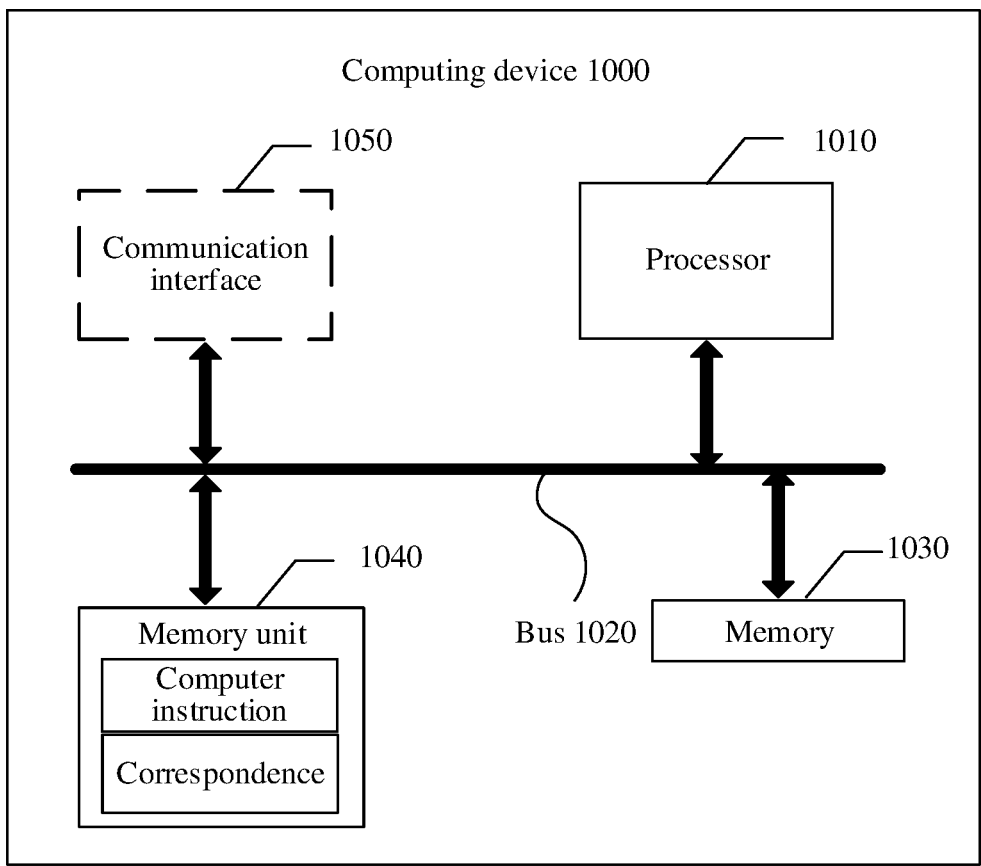
FIG. 10 is a schematic diagram of a structure of a computing device according to an embodiment of this application.

FIG. 10 is a schematic diagram of a structure of a computing device 1000 according to an embodiment. As shown in the figure, the computing device 1000 includes a processor 1010, a bus 1020, a memory 1030, a memory unit 1040, and a communication interface 1050.

It should be understood that, in this embodiment, the processor 1010 may be a CPU, or the processor 1010 may be another general-purpose processor, a digital signal processor (DSP), an application-specific integrated circuit (ASIC), an FPGA or another programmable logic device, a discrete gate or transistor logic device, a discrete hardware component, or the like. The general-purpose processor may be a microprocessor, any conventional processor, or the like.

Alternatively, the processor may be a graphics processing unit (GPU), a neural network processing unit (NPU), a microprocessor, an ASIC, or one or more integrated circuits configured to control program execution in the solutions of this application.

The communication interface 1050 is configured to implement communication between the computing device 1000 and an external device or a component. In this embodiment, the communication interface 1050 is configured to receive to-be-compressed data and send compressed data.

The bus 1020 may include a path configured to transmit information between the foregoing components (for example, the processor 1010, the memory unit 1040, and the memory 1030). In addition to a data bus, the bus 1020 may further include a power bus, a control bus, a state signal bus, and the like. However, for clear description, various types of buses in the figures are marked as the bus 1020. The bus 1020 may be a peripheral component interconnect express (Peripheral Component Interconnect Express, PCIe) bus, an extended industry standard architecture (EISA) bus, a unified bus (Ubus or UB), a compute express link (CXL), a cache coherent interconnect protocol (CCIX), or the like.

In an example, the computing device 1000 may include a plurality of processors. The processor may be a multi-core (multi-CPU) processor. The processor herein may be one or more devices, circuits, and/or computing units configured to process data (for example, computer program instructions). The processor 1010 may invoke correspondences that are between a plurality of compression feature values and compression policies and that are stored in the memory 1030, determine, based on the compression feature value, a compression policy for compressing the to-be-compressed data, and compress the to-be-compressed data according to the compression policy to obtain the compressed data.

It should be noted that, in FIG. 10, that the computing device 1000 includes one processor 1010 and one memory 1030 is merely used as an example. Herein, the processor 1010 and the memory 1030 are separately configured to indicate a component or a device of one type. In a specific embodiment, a quantity of components or devices of each type may be determined based on service requirements.

The memory unit 1040 may correspond to the storage medium that is configured to store information such as correspondences between the plurality of compression feature values and the compression policies in the foregoing method embodiments. The memory unit 1040 may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. By way of example but not limited description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The memory 1030 is configured to store data, and may be a magnetic disk, for example, a mechanical hard disk or a solid-state drive.

The foregoing computing device 1000 may be a general-purpose device or a dedicated device. For example, the computing device 1000 may be a mobile phone terminal, a tablet computer, a notebook computer, a VR device, an AR device, an MR device, an ER device, an in-vehicle terminal, or the like, or may be an edge device (for example, a box carrying a chip with a processing capability), or the like. Optionally, the computing device 1000 may alternatively be a server or another device having a computing capability.

It should be understood that the computing device 1000 according to this embodiment may correspond to the data compression apparatus 900 in this embodiment, and may correspond to a corresponding body in any method in FIG. 4a and FIG. 4b. In addition, the foregoing and another operation and/or function of the modules in the data compression apparatus 900 are respectively configured to implement corresponding procedures of the method in FIG. 4a and FIG. 4b. For brevity, details are not described herein again.

The method steps in embodiments of this application may be implemented by hardware, or may be implemented by executing software instructions by a processor. The software instructions may include a corresponding software module.

The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be disposed in an ASIC. In addition, the ASIC may be located in a network device or a terminal device. Certainly, the processor and the storage medium may alternatively exist as discrete components in the network device or the terminal device.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer programs and instructions. When the computer programs or instructions are loaded and executed on a computer, all or some of procedures or functions in embodiments of this application are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another web site, computer, server, or data center in a wired or wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid-state drive (SSD).

The foregoing descriptions are merely specific implementations of this application, but are not intended to limit the protection scope of this application. Any modification or replacement readily conceived by a person skilled in the art within the technical scope disclosed in this application shall fall within the protection scope of this application. Therefore, the protection scope of this application shall be subject to the protection scope of the claims.

What is claimed is:

1. A data compression method performed by a computing device, the method comprising:

determining a compression feature value of to-be-compressed data based on a first parameter that affects a compression result of the to-be-compressed data, wherein the to-be-compressed data is to be sent by the computing device to a storage device;

determining, based on the compression feature value, a compression policy for compressing the to-be-compressed data, wherein the compression policy comprises a plurality of compression windows;

compressing the to-be-compressed data according to the compression policy to obtain compressed data, wherein the step of compressing the to-be-compressed data according to the compression policy comprises:

separately compressing the to-be-compressed data based on the plurality of compression windows to obtain a plurality of pieces of compressed data;

comparing compression rates of the plurality of pieces of compressed data; and selecting, from the plurality of pieces of compressed data based on the comparing, first compressed data with a highest compression rate as the compressed data; and sending a data packet to the storage device, wherein the data packet comprises a packet header and a payload, and the payload includes the first compressed data and a compression window of the first compressed data.

2. The method according to claim 1, wherein the first parameter comprises a parameter of a hardware resource used when the to-be-compressed data is compressed, or a parameter of a data feature that describes the to-be-compressed data.

3. The method according to claim 2, wherein the parameter of the data feature comprises a data type, a data block size, or distribution of characters comprised in the to-be-compressed data.

4. The method according to claim 2, wherein the parameter of the hardware resource comprises a usage ratio of a processor of the computing device, a network bandwidth between the computing device and the storage device when the compressed data is sent to the storage device, or an available storage capacity of the storage device.

5. The method according to claim 1, wherein the computing device stores correspondences between a plurality of compression feature values and compression policies, and wherein the step of determining the compression policy for compressing the to-be-compressed data comprises:

determining a compression feature value that is in the correspondences and that corresponds to the compression feature value of the to-be-compressed data; and determining, based on the compression feature value determined based on the correspondences, a compression policy corresponding to the compression feature value as the compression policy for compressing the to-be-compressed data.

6. The method according to claim 5, wherein the correspondences between the plurality of compression feature values and the compression policies are obtained based on neural network training.

7. The method according to claim 1, wherein after obtaining the compressed data, the method further comprises:

determining a compression rate of the compression policy used when data is compressed; and adjusting the compression feature value and a parameter of the compression policy in the correspondence based on the compression rate.

8. A computing device comprising:

a memory storing executable instructions; and a processor configured to execute the executable instructions to perform operations of:

determining a compression feature value of to-be-compressed data based on a first parameter that affects a compression result of the to-be-compressed data, wherein the to-be-compressed data is to be sent by the computing device to a storage device;

determining, based on the compression feature value, a compression policy for compressing the to-be-compressed data, wherein the compression policy comprises a plurality of compression windows;

compressing the to-be-compressed data according to the compression policy to obtain compressed data, wherein the step of compressing the to-be-compressed data according to the compression policy comprises:

separately compressing the to-be-compressed data based on the plurality of compression windows to obtain a plurality of pieces of compressed data;

comparing compression rates of the plurality of pieces of compressed data; and selecting, from the plurality of pieces of compressed data based on the comparing, first compressed data with a highest compression rate as the compressed data; and sending a data packet to the storage device, wherein the data packet comprises a packet header and a payload, and the payload includes the first compressed data and a compression window of the first compressed data.

9. The computing device according to claim 8, wherein the first parameter comprises a parameter of a hardware resource used when the to-be-compressed data is compressed, or a parameter of a data feature that describes the to-be-compressed data.

10. The computing device according to claim 9, wherein the parameter of the data feature comprises a data type, a data block size, or distribution of characters comprised in the to-be-compressed data.

11. The computing device according to claim 9, wherein the parameter of the hardware resource comprises a usage ratio of a processor of the computing device, a network bandwidth between the computing device and the storage device when the compressed data is sent to the storage device, or an available storage capacity of the storage device.

12. The computing device according to claim 8, wherein the processor is configured to store correspondences between a plurality of compression feature values and compression policies, and wherein the operation of determining the compression policy for compressing the to-be-compressed data comprises:

determining a compression feature value that is in the correspondences and that corresponds to the compression feature value of the to-be-compressed data; and determining, based on the compression feature value determined based on the correspondences, a compression policy corresponding to the compression feature value as the compression policy for compressing the to-be-compressed data.

13. The computing device according to claim 12, wherein the correspondences between the plurality of compression feature values and the compression policies are obtained based on neural network training.

14. The computing device according to claim 8, wherein after obtaining the compressed data, the processor is configured to perform operations of:

determining a compression rate of the compression policy used when data is compressed; and adjusting the compression feature value and a parameter of the compression policy in the correspondence based on the compression rate.

15. A storage system, comprises:

a computing node; and a storage node, wherein the computing node is configured to perform operations of:

determining a compression feature value of to-be-compressed data based on a first parameter that affects a compression result of the to-be-compressed data, wherein the to-be-compressed data is to be sent by the computing node to the storage node;

determining, based on the compression feature value, a compression policy for compressing the to-be-compressed data, wherein the compression policy comprises a plurality of compression windows;

compressing the to-be-compressed data according to the compression policy to obtain compressed data, and storing the compressed data, wherein the step of compressing the to-be-compressed data according to the compression policy comprises:

separately compressing the to-be-compressed data based on the plurality of compression windows to obtain a plurality of pieces of compressed data;

comparing compression rates of the plurality of pieces of compressed data; and selecting, from the plurality of pieces of compressed data based on the comparing, first compressed data with a highest compression rate as the compressed data; and sending a data packet to the storage node, wherein the data packet comprises a packet header and a payload, and the payload includes the first compressed data and a compression window of the first compressed data; and wherein the storage node is configured to store the first compressed data.

16. The storage system according to claim 15, wherein the first parameter comprises a parameter of a hardware resource used when the to-be-compressed data is compressed, or a parameter of a data feature that describes the to-be-compressed data.

17. The storage system according to claim 16, wherein the parameter of the data feature comprises a data type, a data block size, or distribution of characters comprised in the to-be-compressed data.

18. The method according to claim 16, wherein the parameter of the hardware resource comprises a usage ratio of a processor of the computing device, a network bandwidth between the computing device and the storage device when the compressed data is sent to the storage device, or an available storage capacity of the storage device.

* * * * *